United States Patent
Takagi et al.

(10) Patent No.: US 6,265,853 B1
(45) Date of Patent: *Jul. 24, 2001

(54) POWER SOURCE UNIT FOR TRANSFERRING ENERGY BETWEEN POWER SOURCES THAT POWER AN ELECTRIC VEHICLE

(75) Inventors: Sakae Takagi, Sendai; Hideki Mori, Nagoya; Shouzou Hashidume, Nara; Kiyomi Yamasaki, Fukuoka; Nobuhito Ohnuma, Mishima; Nobuyuki Kasuga, Tokyo, all of (JP)

(73) Assignees: Tohoku Electric Power Co., Inc., Miyagi; Chubu Electric Power Co., Inc., Nagoya; The Kansai Electric Power Co., Inc., Osaka; Kyushu Electric Power Co., Inc., Fukuoka; Tokyo R&D Co., Ltd., Tokyo, all of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,072

(22) Filed: Nov. 5, 1998

(30) Foreign Application Priority Data

Nov. 10, 1997 (JP) .................................................... 9-323863

(51) Int. Cl.[7] .............................. H02H 7/122; H02M 7/44
(52) U.S. Cl. .............................. 323/220; 363/56; 363/97
(58) Field of Search ................................ 323/220; 363/16, 363/55, 56, 95, 97, 131

(56) References Cited

U.S. PATENT DOCUMENTS

| 4,148,090 | * | 4/1979 | Kawai et al. | 361/152 |
| 5,486,749 | * | 1/1996 | Brainard | 320/125 |
| 5,563,479 | * | 10/1996 | Suzuki | 318/139 |
| 5,603,308 | * | 2/1997 | Ooyabu et al. | 323/284 |

* cited by examiner

Primary Examiner—Peter S. Wong
Assistant Examiner—Bao Q. Vu
(74) Attorney, Agent, or Firm—McDermott, Will & Emery

(57) ABSTRACT

A power source unit for use in vehicle is disclosed that effectively transfers energy between two power sources. The power source unit includes a main power source connected to input terminals of a current control circuit, such as insulation type power transfer circuit. In addition, a terminal of the main power source is connected to an output terminal of the current control circuit. The other terminal of the main power source is connected to a terminal of a parallel connection of a secondary power source and an electric power unit. The other terminal of the parallel connection is connected with a second output terminal of the current control circuit. Hence, energy from the main power source is transferred to the parallel connection of the secondary power source and electric power unit under the control of the current control circuit.

9 Claims, 5 Drawing Sheets

POWER SOURCE UNIT FOR TRANSFERRING ENERGY BETWEEN POWER SOURCES THAT POWER AN ELECTRIC VEHICLE

DETAILED DESCRIPTION

1. Field of the Invention

The present invention relates to a power source unit for effectively transferring energy between the first and the second power sources and an electric vehicle loaded therewith, and more particularly, to a power source unit comprising first and second power sources and an insulation type power transfer circuit such as a current control circuit, etc.

2. Prior Art

It is generally known that the use of cells under a rapidly changing loading condition makes a capacity thereof smaller and a duration of life shorter compared with a constant loading condition. Cells applied to an electric vehicle, for example, exhibit such undesirable phenomena.

Radical, rapid and frequent changes in the load condition of cells are seldom observed in such equipment and devices as portable personal computers, e.g., lap top computers, or portable audio systems, e.g., handy cassette recorder, etc.

In the case of an electric vehicle, however, loading to motors, etc. (or motor load) changes radically, rapidly and frequently when the vehicle starts, accelerates, brakes or goes up a slope. Such a change in motor load directly affects the loading condition of cells, which causes a decrease in the capacity and shortening of the duration of life more remarkably than those cells used under a constant loading condition.

A power source unit for conventional electric vehicles is generally designed to meet the above mentioned radical, rapid and frequent change in motor load even though the capacity and the duration of life of cells are sacrificed to a certain extent. On the other hand, it is also tried to develop a power source unit for electric vehicles sufficient to increase the capacity and the duration of life of cells.

For example, a change in a loading condition of a cell as a main power source has been conventionally controlled to keep constant to the utmost by means of a power source unit which comprises a combination of the main power source and a cell or condenser of high capacity as a sub power source, thereby charging the above mentioned radical, rapid and frequent change in the motor load to the sub power source.

FIG. 4 shows a conventional power source unit for electric vehicles. The power source unit 5 comprises a main power source 51 including a cell and a sub power source 52 including a cell or condenser. The main power source 51 and a sub power source 52 are connected in parallel (in FIG. 4, a condenser is used as the sub power source for convenience). Energy is supplied from the power source unit 5 to a motor unit 6 comprising an inverter 61 and a vehicle driving motor 62.

In the power source unit 5, a terminal voltage of the main and sub power sources 51 and 52 is the same. As a partial current charge ratio is spontaneously determined by an inverse ratio of respective internal resistance (R1 and R2) it is limited to control the change in the loading condition of the main power source within a certain level of range.

In order to prevent the above mentioned inconvenience, it is known that a power source unit 5 comprises a current control circuit 53 consisting of a DC/DC converter which is connected between a main power source 51 and a sub power source 52, as shown in FIG. 5. In the power source unit 5, a current division ratio of the main power source 51 and the sub power source 52 is determined by a current control circuit 53, thereby the loading condition of the main power source 51 being limited within a certain region.

When energy transfer is performed between the main power source 51 and the sub power source 52 in the power source unit 5 shown in FIG. 5, however, efficiency of energy transfer in the current control circuit 53 directly affects that of the electric power source unit as a whole because energy inevitably passes through the circuit 53. Consequently, a merit of securing a sufficient capacity of the main power source by arranging the sub power source is inversely decreased or canceled due to the current control circuit 53 when energy loss therein is significant.

As matter of course, it is possible to increase the overall efficiency of the power source unit by means of a current control circuit of higher energy transfer efficiency, but such a circuit is expensive and raises the production cost of electric vehicles.

In the above mentioned examples, a cell is used as the main power source 51 in the power source unit, while a fuel cell or an engine generator is employed as the main source in the case of a so-called hybrid electric vehicle. In a normal internal combustion type vehicle driven by a gasoline engine, the engine efficiency decreases accompanying an increase in toxic exhaust gas under a heavily loaded condition such as when the vehicle starts, accelerates, brakes goes up a slope. On the other hand, in the above mentioned hybrid vehicle in which the main power source is, for example, an engine generator, it is possible to drive the generator most efficiently under a constant condition with exhausting a lesser amount of toxic gas. That is to say, the engine generator as the main power source is most efficiently driven under a constant condition with exhausting lesser amount of toxic gas to charge the sub power source, and the thus charged energy therein is used to drive a vehicle driving motor under the considerably loaded condition.

As shown in FIG. 6, in such a power source unit 7 of a hybrid electric vehicle, a current control circuit 73 is arranged between a main power source (i.e., engine generator) 71 and a sub power source (in this example, shown as a cell) 72. Here again, in the power source unit 7, when energy transfer is performed between the main power source 71 and the sub power source 72 , the efficiency of energy transfer in the current control circuit 73 directly affects the overall efficiency of the power source unit because all energies pass through the current control circuit 73.

Consequently, a merit of improving specific fuel consumption and decreasing the toxic exhaust gas by driving the vehicle under a constant condition is inversely decreased or canceled due to the current control circuit 73 when energy loss therein is significant.

OBJECT OF THE INVENTION

It is an object of the present invention to provide a power source unit comprising first and second power sources and a insulation type power transfer circuit having two input terminals and two output terminals in which energy transfer is effectively performed between the first and the second power sources, and an electric vehicle loaded therewith.

SUMMARY OF THE INVENTION

The present invention has been made based on the recognition of that, in a power source unit comprising first and second power sources and an insulation type power transfer circuit having two input terminals and two output terminals, when energy is transferred from the first power source to the second power source, if it is possible to transfer only a part of energy through an insulated type power transfer circuit, energy loss in the power transfer circuit can be reduced.

A power source unit according to the present invention comprises a first power source, an insulated type power transfer circuit having two input terminals and two output terminals, and a parallel circuit including a second power source and a load unit. The first power source is connected between the two input terminals of the insulated type power transfer circuit. One of terminals of the first power source is connected to the first output terminal of the insulated type power transfer circuit. The parallel circuit is connected between the second output terminal of the insulated type power transfer circuit and the second terminal of the first power source. In this power source unit, energy transfer is performed between the first power source and the parallel circuit.

The first power source may be an generator (generally, DC generator) or a fuel cell, or a galvanic cell (hereinafter simply referred to as a cell), while the second power source may be a condenser or a cell. The insulation type power transfer circuit is a power circuit generally called as a DC/DC converter in which input and output sides thereof are insulated and output voltage or current is controlled. When both of the first and the second power sources are DC power sources and the load unit is a DC generator, a DC/DC converter is employed as the insulation type power transfer circuit.

An electric vehicle according to the present invention is loaded with the above mentioned power source unit, the load unit comprising a motor to be used to drive the vehicle. As a matter of fact, the term "electric vehicle" used herein is not limited to vehicles or auto trucks but includes motorcycles, mopeds and the like.

The above mentioned power source unit is not limited only to an application to the electric vehicle but is applicable to ships, track vehicles and the like which require relatively high power.

PREFERRED EMBODIMENTS

As a preferred embodiment of the present invention, there is shown a power source unit of an electric vehicle. In FIG. 1, the power source unit 1 comprises a cell as a main power source 11 (first power source), a condenser as a sub power source (second power source) and an insulation type DC/DC converter as a current control circuit 13 (insulation type power transfer circuit) provided with two input terminals and two output terminals.

Input terminals a and b of the current control circuit 13 are connected to a (+) terminal e and a (−) terminal f of the main power source 11, respectively. On the other hand, output terminals c and d of the current control circuit 13 are connected to the (−) terminal f of the main power source 11 and one terminal h of the sub power source 12, respectively. The other terminal g of the sub power source 12 is connected to the (+) terminal e of the main power source 11. Further, a motor unit 2 (load unit) comprising an inverter 21 and a vehicle driving motor 22 is connected to terminals g and h of the sub power source 2.

In FIG. 1, the voltage Va between terminals g and h of the sub power source 12 is represented as the following equation:

$$Va=Vb+Vd \quad (1)$$

wherein, Vb is the voltage of the main power source 11 (i.e., the input voltage of the current control circuit 13), and Vd is the output voltage of the circuit 13.

The input current Ia of the current control circuit 13 is:

$$Ia=Ib-Id \quad (2)$$

wherein, Ib is the load current of the main power source 11 and Id is the output current of the current control circuit 13.

The input power Pi of the current control circuit 13 is given as the following equation.

$$Pi=Vb \times Ia=Vb \times (Ib-Id) \quad (3)$$

The output power Po of the current control circuit 13 is represented as follows.

$$Po=Vd \times Id \quad (4)$$

Then, a DC/DC converting efficiency η is represented as in the following:

$$\eta=Po/Pi=(Vd \times Id)/[Vb \times (Ib-Id)] \quad (5)$$

A power Pc transferred from the main power source 11 to the sub power source 12 is:

$$Pc=Va \times Id=(Vb+Vd) \times Id \quad (6)$$

and a power consumption P of the main power source 11 is:

$$P=Vb \times Ib \quad (7)$$

Then, an efficiency H of the power source unit 1 as a whole is represented as in the following:

$$H=Pc/P=(vb+Vd) \times Id/(Vb \times Ib) \quad (8)$$

Thus, the current flowing from the main power source 11 to the sub power source 12 is equal to the output current Id of the current control circuit 13, while the voltage Va between the terminals g and h of the sub power source 12 is equal to a sum of the input voltage Vb and the input voltage Vd of the current control circuit 13 as shown in the equation (1). Accordingly, the main power source 11 and the current control circuit 13 transfer energy to the sub power source while taking partial charge of the voltage Vb and Vd each other in the power source unit 1 shown in FIG. 1.

The voltage Vd can be adjusted by controlling the voltage in an appropriate range where normal loading is performed. More concretely, when the main power source 11 takes a half charge of voltage impressed to the sub power source 12 and the current control circuit 13 takes the rest half, the efficiency of the power source unit 1 as a whole is represented as in the following:

$$H=Pc/P=2\eta/(1+\eta) \quad (9)$$

In the case of a power source unit of the conventional electric vehicle shown in FIG. 5, however, a DC/DC converting efficiency η' of the current control circuit 53 represents an efficiency H' of the power source unit itself, if an energy loss by the internal resistance in the main and sub power sources 51 and 52 is ignored.

If the DC/DC converting efficiency of both current control circuits 13 and 53 shown in FIGS. 1 and 5 is equal, $$H-H'=2\eta/(1+\eta)-\eta=\eta(1-\eta)/(1+\eta)>0 \quad (10)$$

$(1>\eta>0)$ then H>H'

For example, let η=90%, the resulting efficiencies appear as H=94.73% and H'=90%, which demonstrates that the efficiency H of the power source unit 1 as a whole is about 5% higher than that of the conventional unit 5.

As described above, it is possible to perform energy transfer effectively between the main power source 11 and the sub power source 12 in the power source unit 1 of the present invention.

The (+) terminal e of the main power source 11 is connected to one of terminals of the condenser as the sub power source 12 and the (−) terminal f thereof is connected to the output terminal c of the current control circuit 13 as shown in FIG. 1, while a similar effect can be easily obtained when the (−) terminal f of the main power source 11 is connected to one of the terminals of the condenser as the sub power source 12 and the (+) terminal e of the main power source 11 is connected to the output terminal d of the current control circuit 13 as shown in FIG. 2.

Although there has been described the power source unit which comprises one current control circuit in the above mentioned embodiment, it is possible to provide a number of variations of the present power source unit having structure in which the main power source 11 supplies energy to a parallel connecting circuit of the condenser as the sub power source 12 and the electric power unit 2 through a terminal which is not connected to the output terminal of the current control circuit. For example, the power source unit may comprise a plurality of current control circuits as shown in FIG. 3 (A) to (D).

In a power source unit 1A shown in FIG. 3 (A), two terminals of a main power source 111 are connected to each of two input terminals of plural (in this embodiment, two) current control circuits 131a and 131b. Further, one of output terminals of the current control circuit 131a is connected to one of the terminals of the main power source 111 and the other output terminal thereof is connected to one of output terminals of the current control circuit 131b. A parallel connecting circuit of a sub power source 12 and an electric power unit 2 is connected between the other terminal of the main power source 111 and the other output terminal of the current control circuit 131b.

A power source unit 1B as shown in FIG. 3 (B) comprises serially connected plural sets (for convenience sake, two sets) of the current control circuit 13 and the main power source 11 shown in FIG. 1. Namely, in FIG. 3 (B), one set of a current control circuit 132a and a main power source 112a and the other set of a current control circuit 132b and a main power source 112b are serially connected, to both ends of which a parallel connecting circuit of the sub power source 12 and the electric power unit 2 is connected.

A power source unit 1C as shown in FIG. 3 (C) comprises serially connected plural sets of the current control circuit 13 and the main power source 11 shown in FIG. 1 and similar sets of the circuit 13 and the source 11 shown in FIG. 2. Namely, in FIG. 3 (C), the power source unit comprises one set of a current control circuit 132a and a main power source 113a and the other set of a current control circuit 133b and a main power source 113b are connected, output terminals of each circuit control circuit 133a and 133b being connected each other on the side where each main power source is not connected. Further, a parallel connecting circuit of the sub power source 12 and the electric power unit 2 is connected between each terminal of the main power sources 113a and 113b on the side to which each output terminal of the current control circuits 133a an and 133b is not connected.

A power source unit 1D as shown in FIG. 3 (D) comprises connected two sets of the current control circuit 13 and the main power source 11 shown in FIG. 1. In FIG. 3 (D), one set of current control circuit 134a and a main power source 114a and the other set of a current control circuit 134b and a main power source 114b are serially connected, an output terminal of the current control circuit 134a on the side to which the main power source 114a being connected to an output terminal of the current control circuit 134b on the side to which the main power source 114b is not connected, while an output terminal of the current control circuit 134a on the side to which the main power source 114a is not connected being connected to an output terminal of the current control circuit 134b on the side to which the main power source 114b is connected. Further, a parallel connecting circuit of the sub power source 12 and the electric power unit 2 is connected between each terminal of the main power sources 114a and 114b on each side to which each output terminal of the current control circuits 134a and 134b.

In these power source unit 1A to 1D as shown in FIGS. 3(A) to (D), effective energy transfer is performed similarly as in cases of those power source units shown in FIGS. 1 and 2.

EFFECTS OF THE INVENTION

Energy transfer between the first and the second power sources can be performed effectively due to the above mentioned structure of the present invention.

Figure 1:
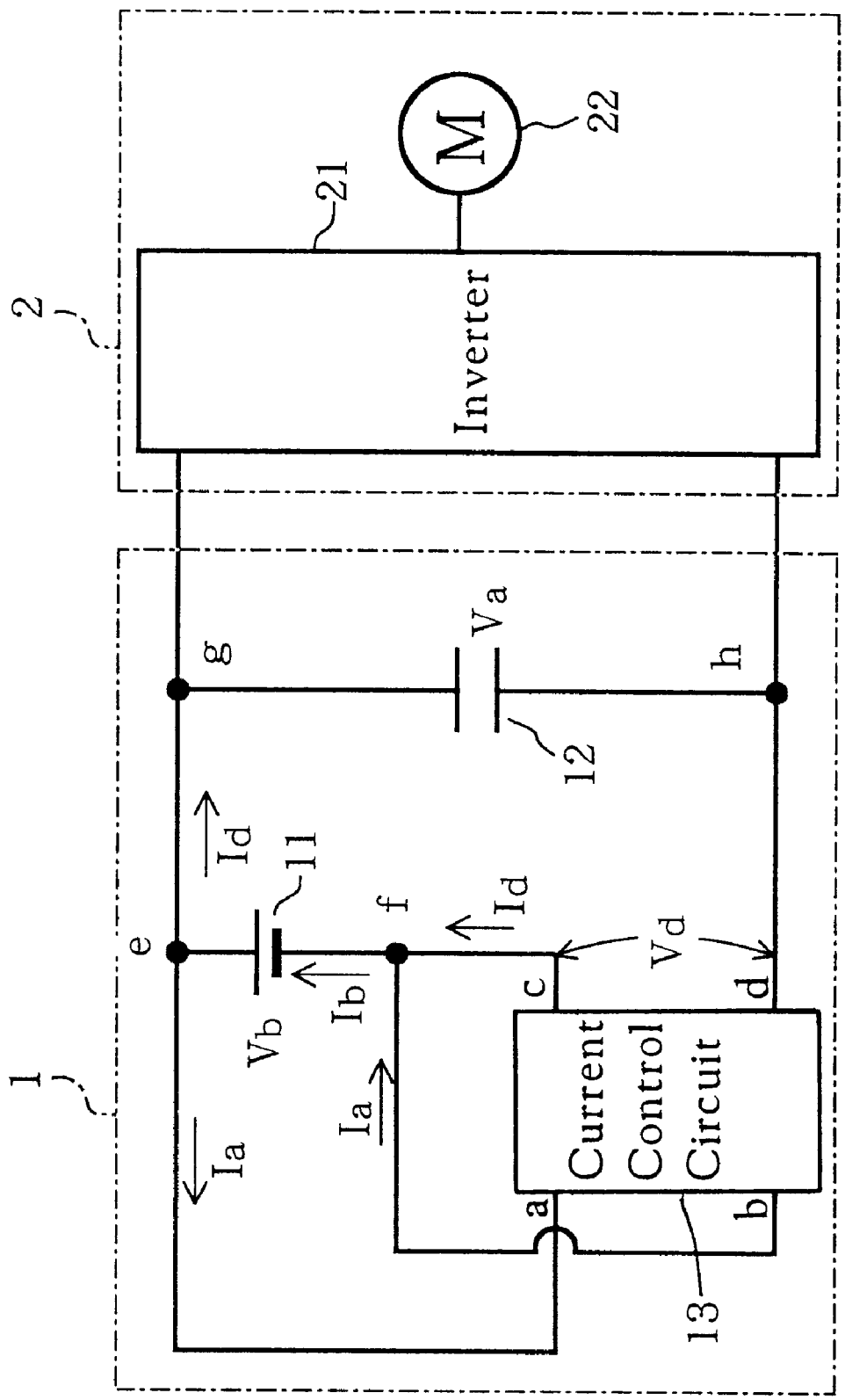
FIG. 1 is a preferred embodiment of a power source unit used in an electric vehicle according to the present invention.
Figure 2:
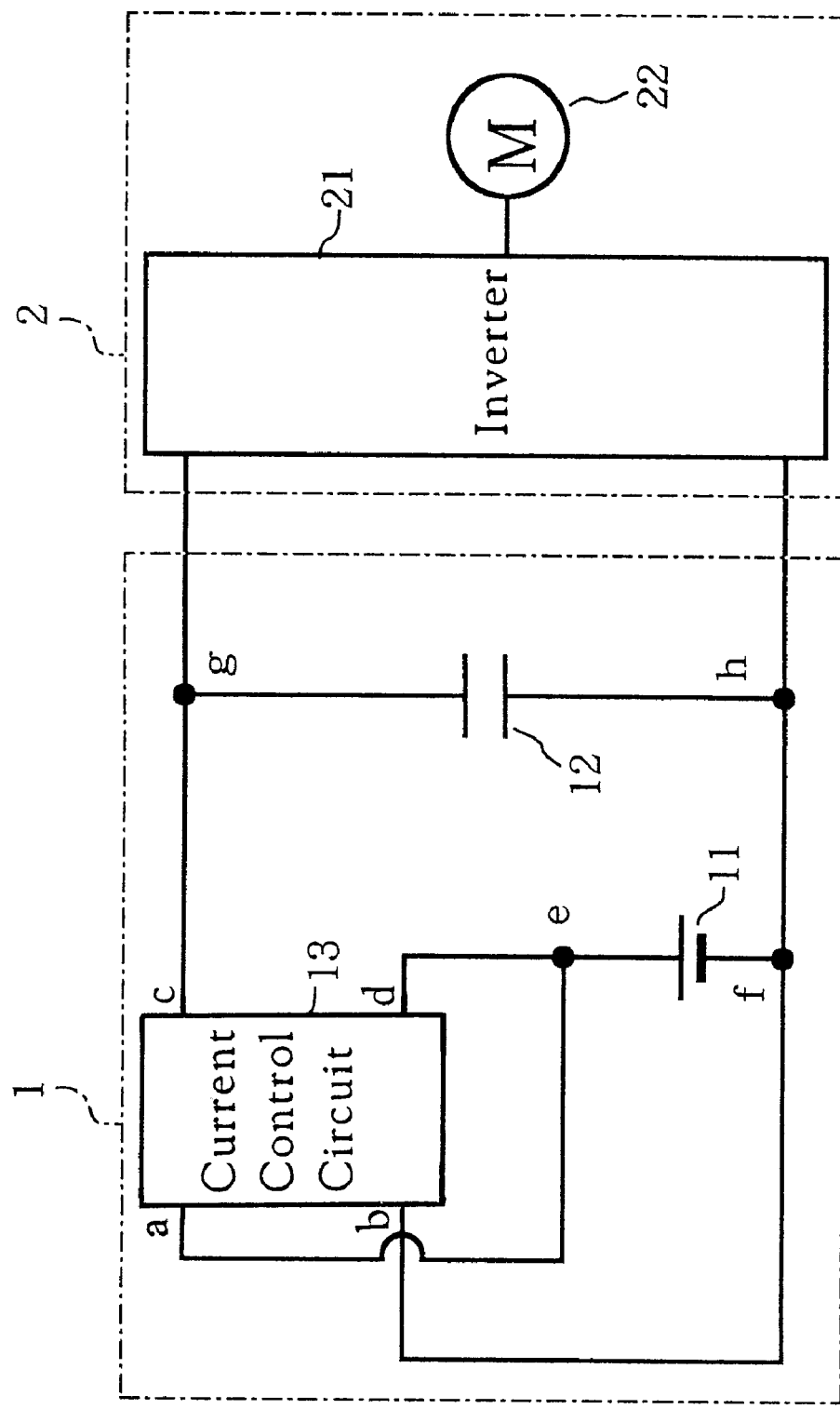
FIG. 2 is a variation of the power source unit shown in FIG. 1.
Figure 3A:
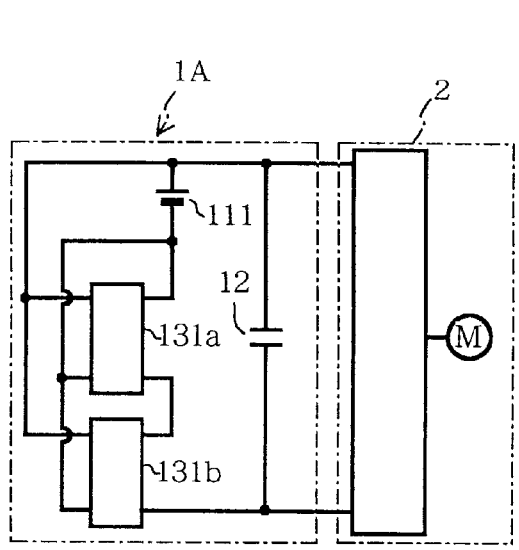
FIGS. 3 (A) to (D) are another embodiments of the present invention in which plural current control circuits are used.
Figure 3B:
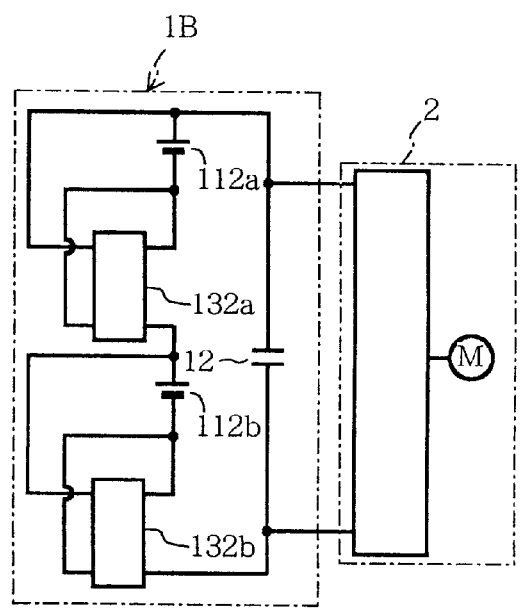
Figure 3C:
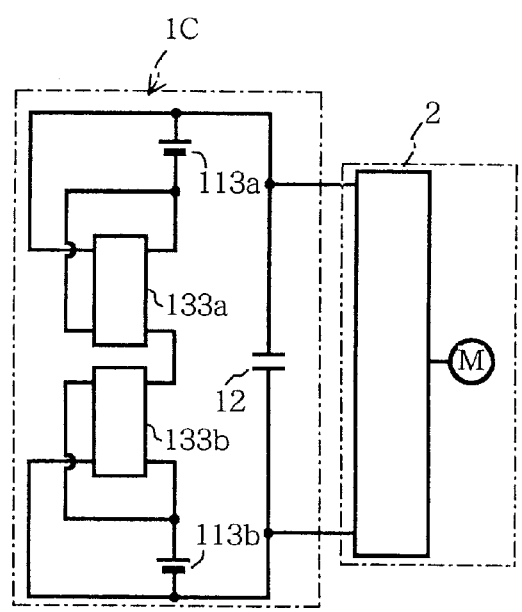
Figure 3D:
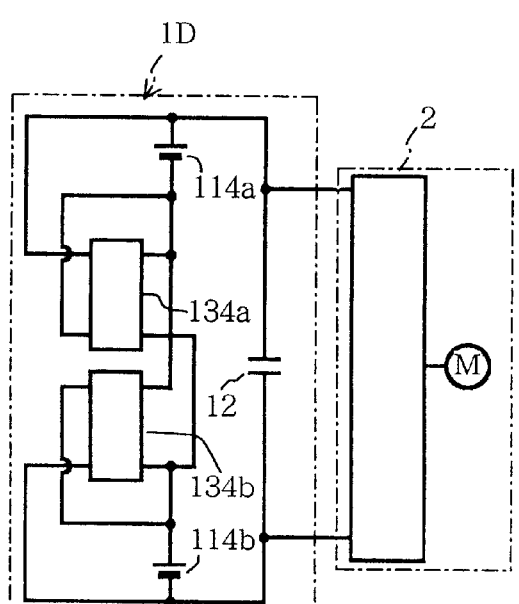
Figure 4:
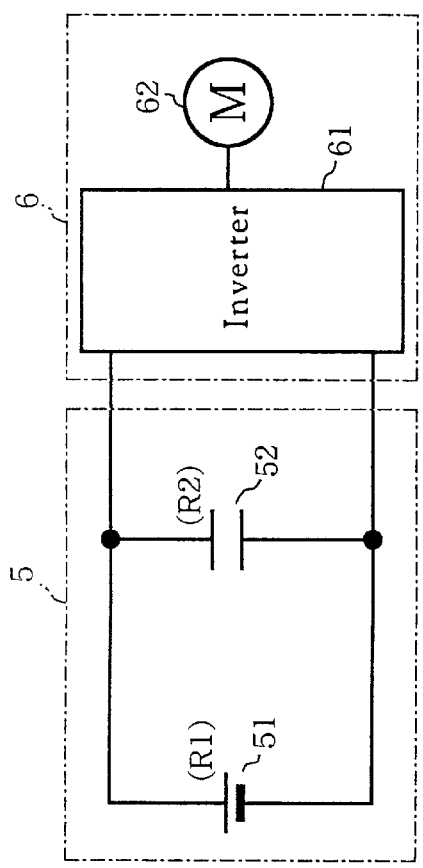
FIG. 4 is an illustration of a power source unit for a conventional electric vehicle comprising a cell as a main power source and a condenser as a sub power source a conventional electric vehicle.
Figure 5:
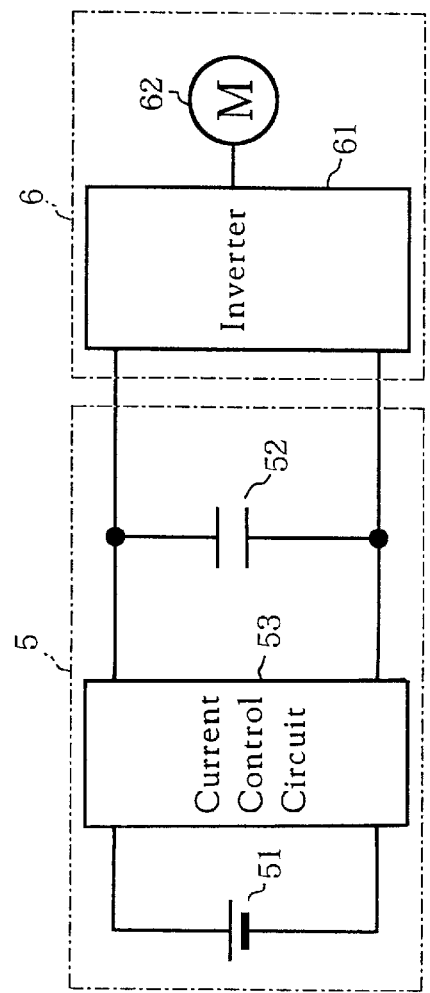
FIG. 5 is an illustration of a power source unit for a conventional electric vehicle comprising a current control circuit between a cell as a main power source and a condenser as a sub power source.
Figure 6:
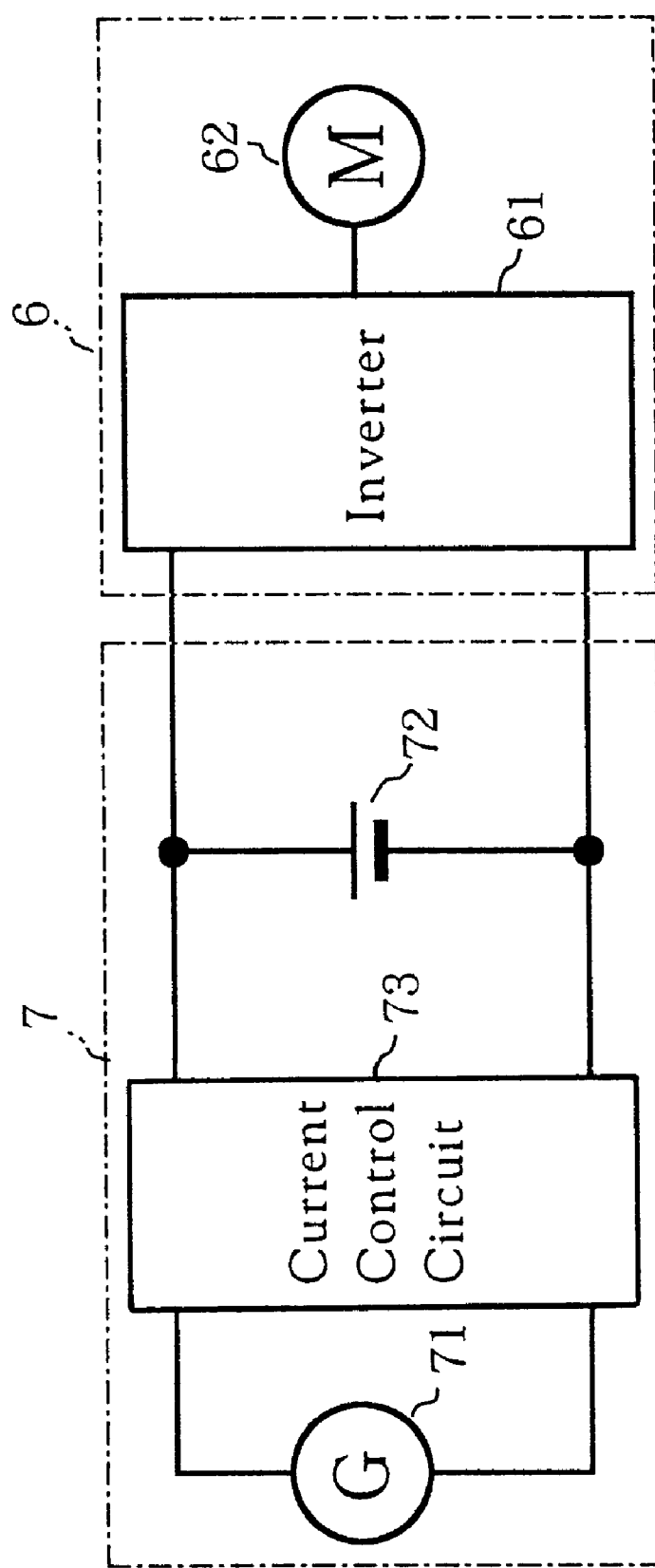
FIG. 6 is an illustration of a power source unit for a conventional electric vehicle comprising a current control circuit between an engine generator as a main power source and a cell as a sub power source.

DESCRIPTION OF SYMBOL 1, 1A to 1D, 5 and 7 Power Source Unit 11, 51, 71, 111, 112a, 112b, 113a, 113b, 114a and 114b Main Power Source 12, 52 and 72 Sub Power Source 13, 53, 73, 131a, 131b, 132a, 132b, 133a, 133b, 134a and 134b
Current Control Circuit 2 and 6 Electric Power Unit 21 and 61 Inverter 22 and 62 Vehicle Driving Motor

What is claimed is:

1. A power source unit (1) comprising:
   a first power source (11);
   an insulated type power transfer circuit (13) having two input terminals (a, b) and two output terminals (c, d); and
   a parallel circuit including a second power source (12) and a load unit (2),
   wherein the first power source (11) is connected between the two input terminals (a, b) of the insulated type power transfer circuit (13), one of terminals of the first power source (11) is connected to the first output terminal (c) of the insulated type power transfer circuit (13), and the parallel circuit is connected between the second output terminal (d) of the insulated type power transfer circuit (13) one of the second terminal of the first power source (11),
   thereby energy transfer is performed between the first power source (11) and the parallel circuit.

2. A power source unit (1) of claim 1 wherein the first power source (11) is a generator, fuel cell or galvanic cell, and the second power source (12) is a condenser or galvanic cell.

3. An electric vehicle loaded with a power source unit (1) of claim 1 in which the load unit (2) comprises a vehicle driving motor.

4. An power source unit (1) of claim 1 comprising plural insulated type power transfer circuit (131a, 131b), wherein at least two of the plural insulated type power transfer circuit are serially connected each other on their output side, and the output terminal of an insulated type power transfer circuit which is not connected to another insulated type power transfer circuit is connected to one terminal of the parallel circuit.

5. A power source unit (1) of claim 1 comprising plural sets of an and a first power source, wherein at least two of the acts are serially connected each other, and the parallel circuit (2) is connected between the terminals of the first power source (112a) not being connected to first insulated type power transfer circuit (132a) and the output terminal of second insulated type power transfer circuit (132b) trot being connected to second power source (112b).

6. A power source unit (1) of claim 1 comprising plural sets of an insulated type power transfer circuit and a first power source, wherein at least two of the sets are interconnected via the output terminals of the insulated type power transfer circuit (133a, 133b) not being connected to each first power source (113a, 113b) of the two sets, and the parallel circuit (2) is connected between the terminals of the first power sources not being connected to the output terminals of the insulated type power transfer circuit.

7. A power source unit (1) of claim 1 comprising plural sets of an insulated type power transfer circuit and a first power source, wherein at least two of the sets are serially connected each other, and the parallel circuit (2) is connected between the terminals of the first power sources (114a, 114b) not being connected to the output terminals of the insulated type power transfer circuit (134a, 134b).

8. A power source unit of claim 1, wherein said one of terminals of the first power source is a negative terminal, and said second terminal of the first power source is a positive terminal.

9. A power source unit of claim 1, wherein said one of terminals of the first power source is a positive terminal, and said second terminal of the first power source is a negative terminal.

* * * * *